July 1, 1930.  R. A. SCHAFFNER  1,768,635
APPARATUS FOR STERILIZING CEREALS WITH ULTRA VIOLET RAYS
Filed Jan. 14, 1928   2 Sheets-Sheet 1

Inventor
Rome A. Schaffner
By
Attorney

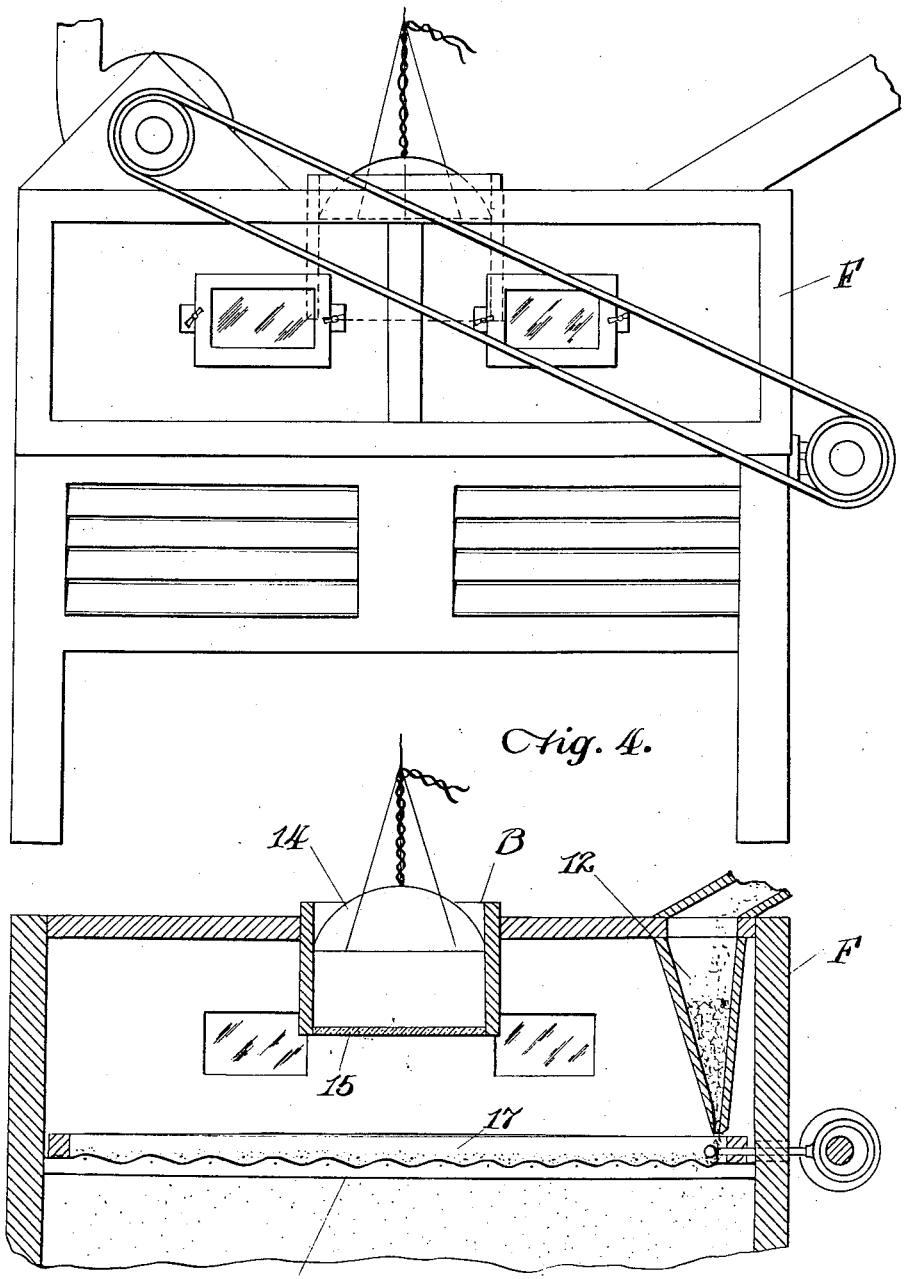

Patented July 1, 1930

1,768,635

UNITED STATES PATENT OFFICE

ROME A. SCHAFFNER, OF ST. PAUL, MINNESOTA

APPARATUS FOR STERILIZING CEREALS WITH ULTRA-VIOLET RAYS

Application filed January 14, 1928. Serial No. 246,893.

My invention relates to the method and apparatus of sterilizing cereals with ultra-violet rays and is particularly adapted to cereals used as breakfast foods and the like wherein it is desired to treat the cereals after they have been prepared in a manner to be readily packaged so as to prevent the spoiling of the cereal in the packages and permitting the storing of the same in these packages, until it is ready for use. It is very important in the preparation of cereal foods to provide a sterilization of the same without destroying the nourishing beneficial properties thereof to treat the same in a manner so that it will be preserved for a period of time before it is offered to the customer.

While other methods of sterilizing cereals have been employed I have found that my method of treating the cereal in thin layers or thin films passed comparatively close to the ultra-violet rays of a mercury vapour lamp is not only benefited by the treatment of this method, but that the cereal is treated in a manner to destroy any germ life of an objectionable nature and maintaining all of the valuable components that are so highly desirable in cereals, more particularly used for breakfast foods.

My method includes an apparatus designed to receive a mercury vapour lamp singularly or collectively in accordance with the size of the apparatus which is held adjustable within a suitable compartment in the apparatus adjacent a cast quartz closure member to protect the mercury vapour lamp and prevent the burning out of the same in use in conjunction with the apparatus adapted to receive the cereal and to pass the same in a thin film back and forth through the apparatus under the influence of the ultra-violet rays for such a time as to thoroughly treat the cereal. My method is carried out by an apparatus adapted to receive the cereal and carry the same in thin layers compelling the particles to be continually on the move through the same and so that they must be submitted to the action of the ultra-violet rays for a certain period of time before the cereal passes out of the apparatus wherein the ultra-violet rays are directed.

To assist in carrying out my invention I have illustrated a particular means of applying the treatment of the ultra-violet rays:

In Figure 1 I have diagrammatically illustrated a preferred form of treating the cereal by the ultra-violet ray apparatus.

Figure 4 illustrates the carrying out of my method in conjunction with a purifier.

Figure 5 is a longitudinal section of the purifier illustrated in Figure 4.

Figure 1:
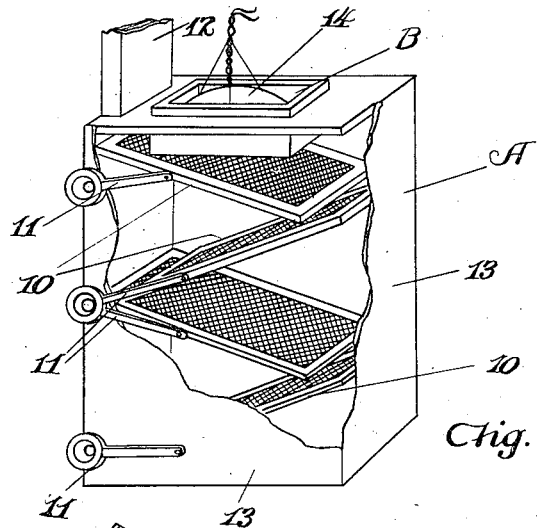

In carrying out my method I employ a cabinet A which may be made with glass sides so that the operation of the method can be observed by the operator. Within the case A, I position a series of screens 10 made of any suitable material and of such a nature as to pass the cereal from one screen to the other, the screens 10 being superimposed and oppositely inclined to direct the cereal which is spread over the same in a thin layer to be passed from one screen to the other until the cereal is passed out of the casing A at a convenient point below the screens.

The screens 10 are adapted to be operated by a pitman rod 11 in the ordinary manner, so as to oscillate the screens sufficiently to cause the same to operate to shake the cereal from one screen to the other. A suitable inlet 12 is provided at the top of the casing A which is so arranged as to direct the cereal into the same in a thin layer extending transversely across the first receiving screen 10.

The sides 13 of the casing A may be made of heavy glass of a nature to retain the ultra-violet rays within the casing, but permitting the action of the rays to extend down through the screens.

Figure 2:
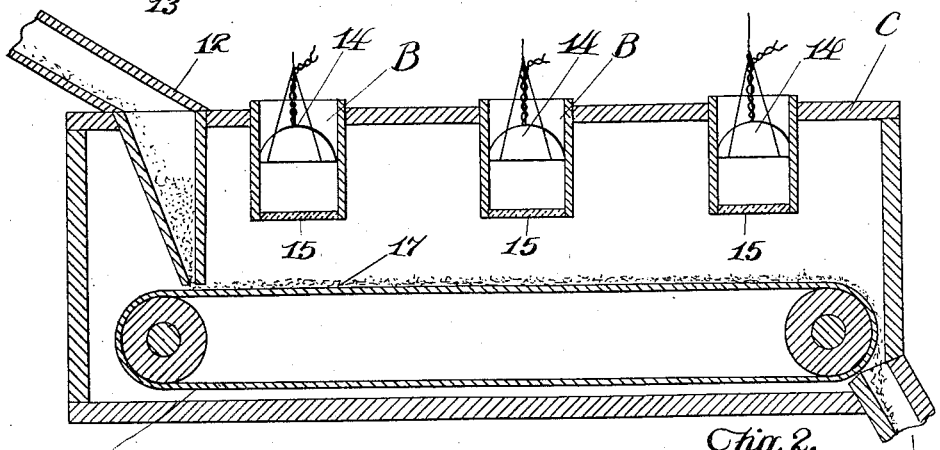
Figure 2 illustrates diagrammatically another form of apparatus.

Within the top of the casing A I provide a recess or chamber B which extends into the casing. In this recess or well I adjustably position a mercury vapour lamp 14. The lower portion of the well or recess B is closed by cast quartz 15 as is illustrated in Figure 2. This protects the mercury lamp 14 and prevents any shorting or damage to the lamp by reason of the dust or particles of the cereal coming in contact with the same. The cast quartz does not retard the ultra-violet rays from the mercury vapour lamp 14 and thus the cereal is permitted to pass in the path of the rays from the mercury lamp and the full influence and radiations are extended to the cereals in such a manner as to destroy any objectionable life associated with the cereal and to thoroughly sterilize the cereal in an economical manner, yet without the disadvantage of destroying the nutritious and beneficial substance within the dry cereals.

In the handling of breakfast cereals and packaging of the same it is extremely important that no larvæ or other animal life be permitted to enter the package with the cereal and my method is designed to sterilize each and every part of the cereal in such a manner so as to penetrate the same so as to insure the overcoming of these detrimental conditions. If any animal life enters the package with the cereal the same may become wormy or destroyed so that it is unfit for use and is extremely detrimental with breakfast foods and cereals owing to the bad effect that it would have with the customer and the unfitness of the goods for food.

I carry out my method by treating the cereal to the ultra-violet rays which thoroughly sterilize the same as it extends in thin layers in the path and influence of the radiations of the mercury vapour lamp. In using the case A in carrying out my method the cereal is kept in the influence of the rays from the lamp 14 until it passes out of the machine.

I have also illustrated in Figure 2 a casing C which may be used in carrying out my method. This casing is provided with an inlet spout 12 which directs the dry cereal to the traveling belt 16 to carry the cereal or edible in a thin layer across the belt beneath the series of mercury vapour lamps 14 positioned in the wells B. The lower portion of these wells are closed by cast quartz to permit the ultra-violet rays to be directed with the proper radiations to the cereal 17 on the endless belt 16. After the cereal is treated it passes out of the discharge opening 19 in the casing C.

Figure 3:
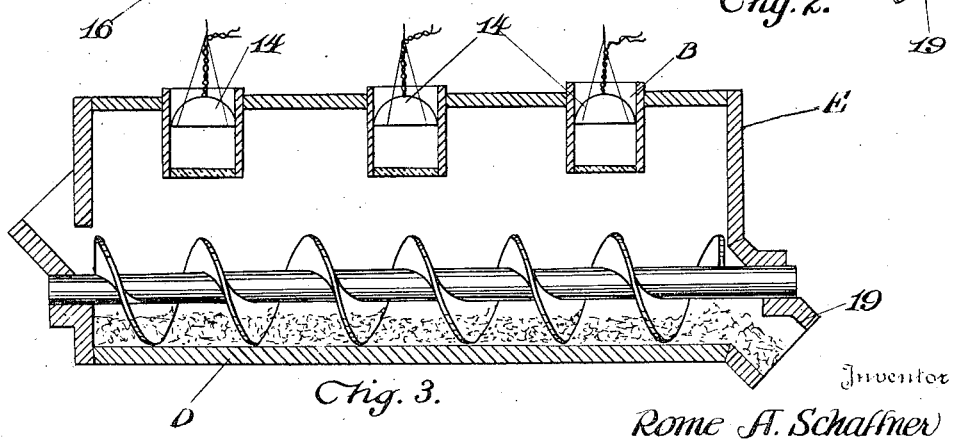
Figure 3 is a different form of apparatus.

I have also illustrated another diagrammatic illustration in Figure 3 showing a spiral propelling member D for carrying the cereal through the casing E beneath the action of the mercury vapour lamp 14. The treated sterilized cereal is passed out of the discharge opening 19 in this casing.

In Figures 4 and 5 I have illustrated a purifier F which is ordinarily used in mills for cereals and which is adapted to be provided with a receiving spout 12 and the shaker screen 18. I have shown the purifier F provided with my mercury vapour lamp 14 which is adjustably positioned in the well B and which is provided with the cast quartz closure 15 to protect the lamp. The lamp 14 is adjustable in the well to direct the ultra-violet rays on to the screen 18 so that as the cereal 17 passes in a thin layer beneath the lamp 14, the radiations and influence of the ultra-violet rays treats the cereal in a manner to completely carry out my method.

My method consists in treating cereals with ultra-violet rays to thoroughly sterilize the same and I carry out my method by such apparatus as is adapted to keep the cereal in the influence of the ultra-violet rays just long enough to properly sterilize the same and not to injure the nutritious values within the cereal. My method includes the packaging of the cereal which I have not illustrated in the drawings, but which is carried out in the ordinary manner by placing the cereal into a package and sealing the same in any suitable manner. The packaging of the cereal is accomplished as soon as the same has passed out of the opening 19. Thus my method is completed by properly treating dry cereal to the influence of ultra-violet rays turning the cereal over and over as it passes over the screens 10 so that the ultra-violet rays will thoroughly sterilize the same for a certain length of time and then immediately packaging the sterilized cereal in a dry state.

All the apparatus is for the purpose of illustrating the different means of carrying out my method of treating cereals to effectively sterilize the same without taking away the nutritious values within the same. I have found that by my method larvæ is destroyed and other animal life is quickly extinguished so that the cereal is thoroughly sterilized and preserved in a manner so as to really be beneficial to the same. It is important that the cereal remain in the influence of the ultra-violet rays long enough to permit the proper sterilization of the same yet without maintaining the cereal too long to injure the same. I have thus provided a means of carrying out my method including an adjustable supporting of the ultra-violet ray or mercury vapour lamp and the well for protecting the same with the quartz closure. I believe the sterilization of cereals by my method is not only to be preferred over other methods but it accomplishes results of a highly desirable nature.

In accordance with the patent statutes I have described the principles of operation of my method and while I have illustrated diagrammatically an apparatus for carrying out the same I desire to have it understood that this is only illustrative of a means of carrying out my method and apparatus best adapted for the purpose and I desire to have it understood that such changes can be made within the scope of the following claims as are best adapted without departing from the spirit of my invention.

I claim:

1. An apparatus for treating cereals including, a casing, shaker screens within said casing super-imposed one above the other in a manner to pass the dry cereal in thin layers from one screen to the other, and an adjustable mercury vapour lamp positioned in a manner to direct ultra-violet rays through a plurality of said screens to treat the cereal passing thereon.

2. An apparatus for sterilizing cereals consisting in means for passing the cereal in a plurality of thin layers into the influence of ultra-violet rays for a period of time, and means for carrying the cereal continually moving and changing position of the cereal as it passes through said apparatus.

3. An apparatus for sterilizing cereal consisting in a casing having glass sides adapted to confine ultra-violet rays within the casing, an adjustable mercury vapour lamp, a well for receiving said lamp, a cast quartz closure for said well, and means for carrying cereal through said casing to cause the cereal to move and change position as it continuously passes through said casing in the influence of ultra-violet rays from said mercury vapour lamp.

ROME A. SCHAFFNER.